July 18, 1933.    G. E. HALLENBECK    1,918,538
TURRET INDEXING MEANS
Filed May 15, 1930    5 Sheets-Sheet 4
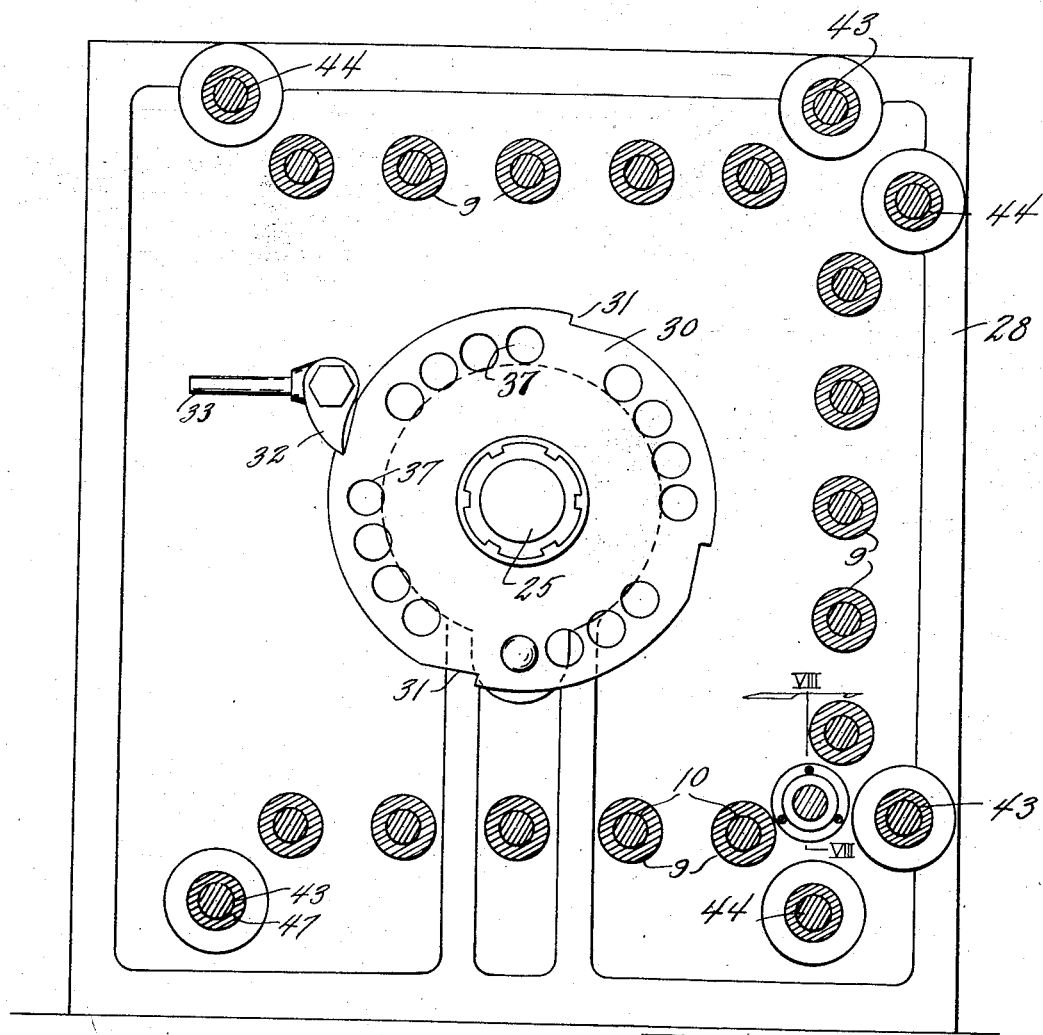
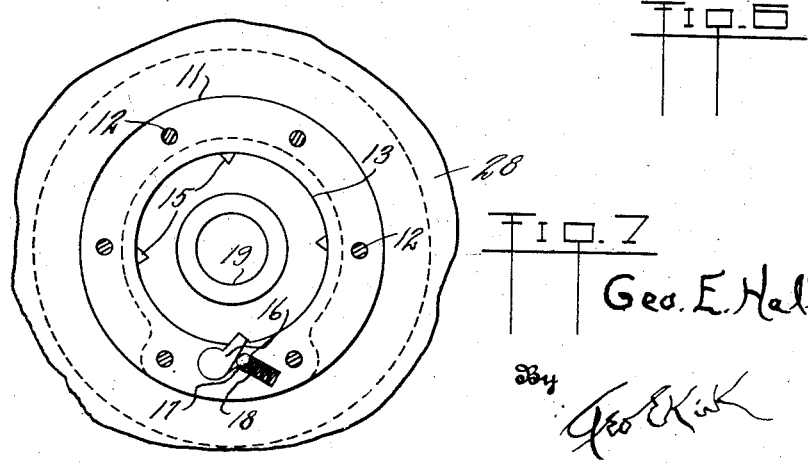
Inventor
Geo. E. Hallenbeck
By Geo. E. Kirk
Attorney

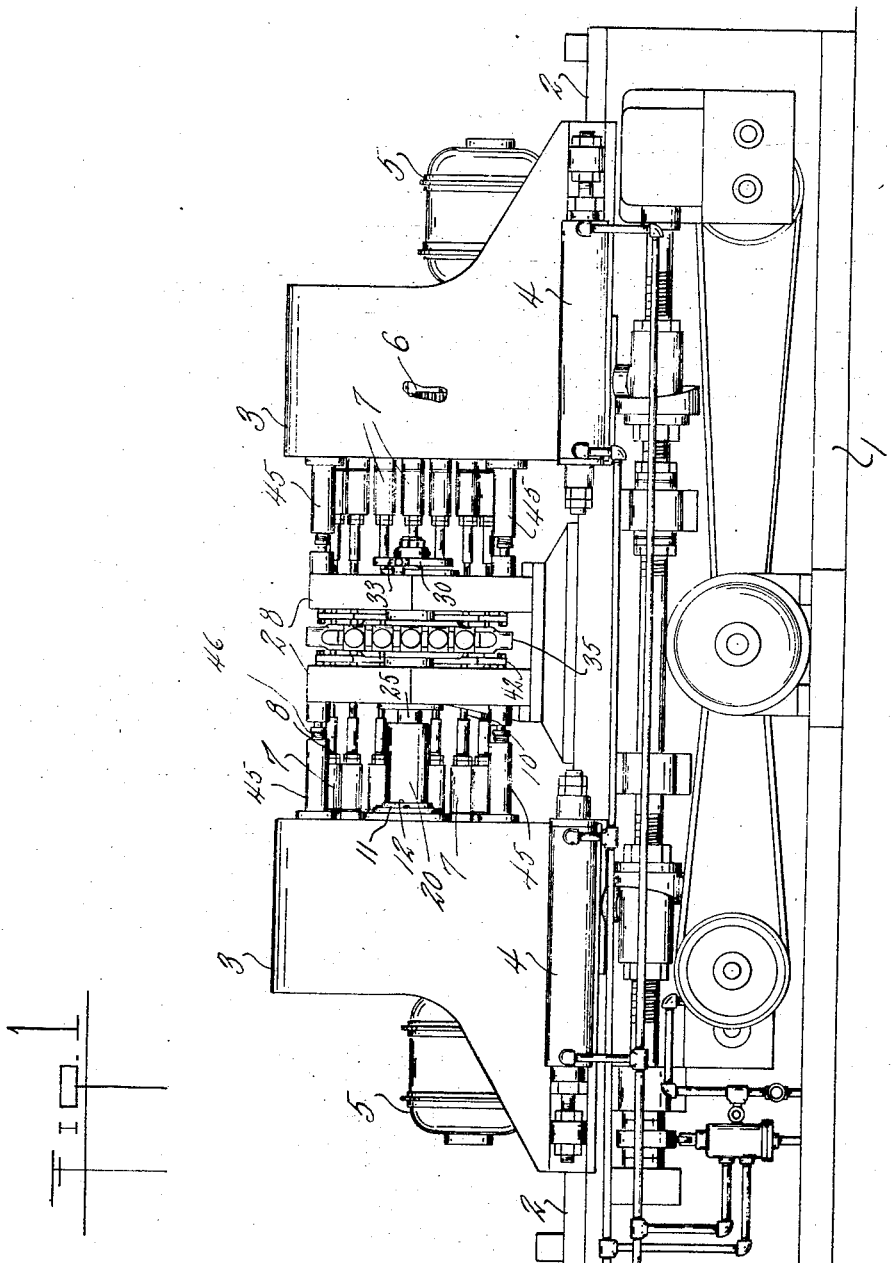

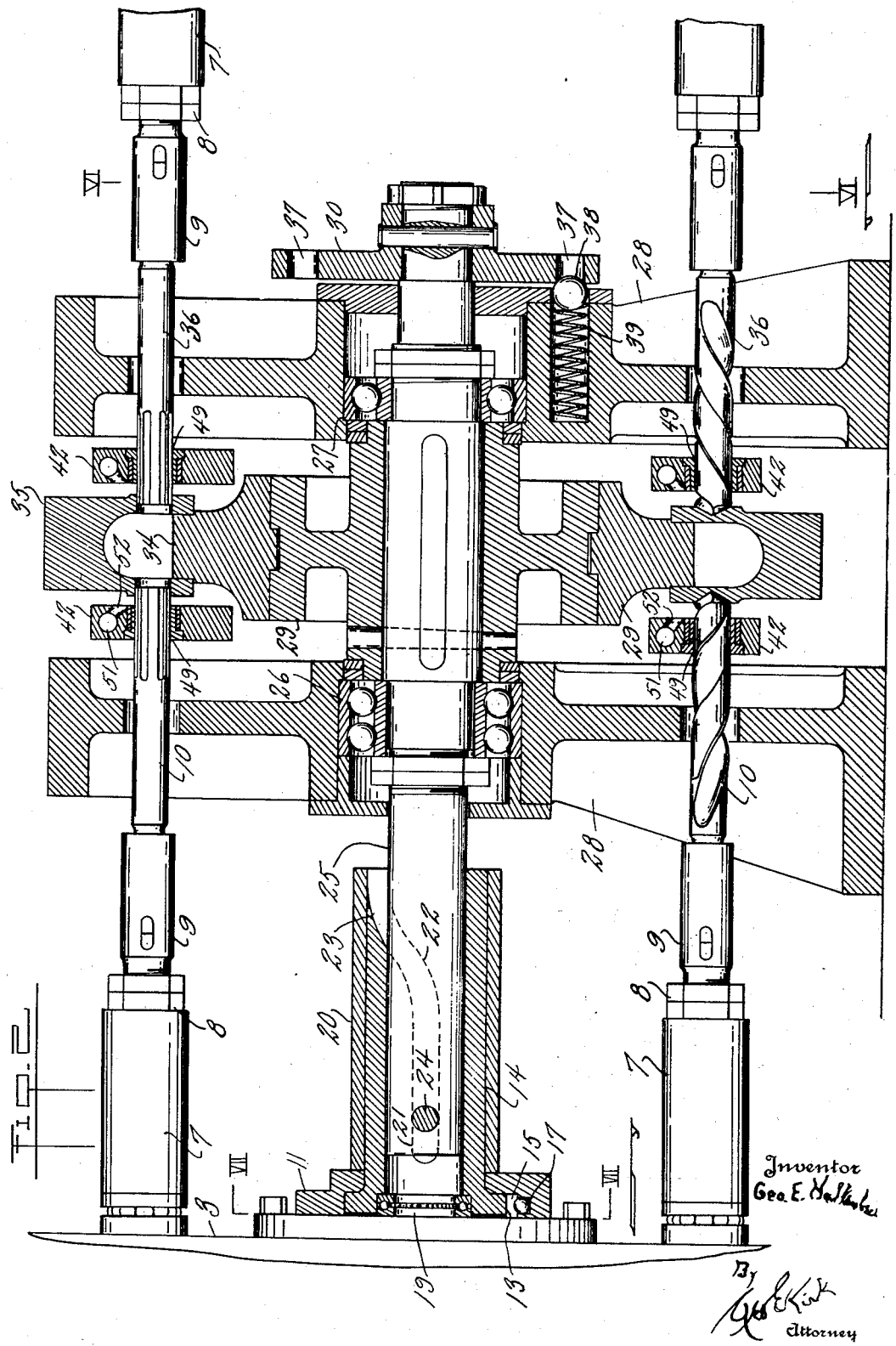

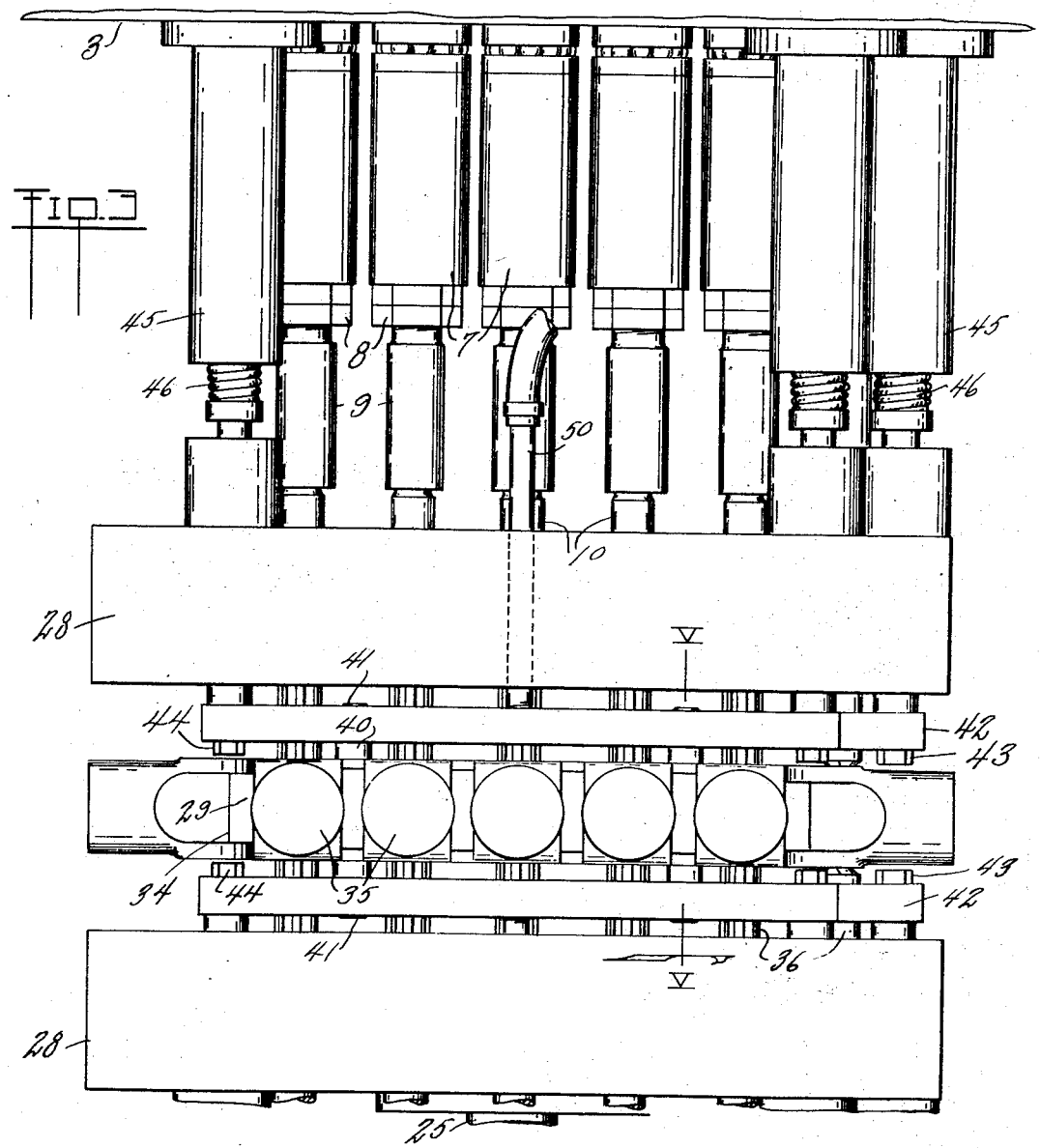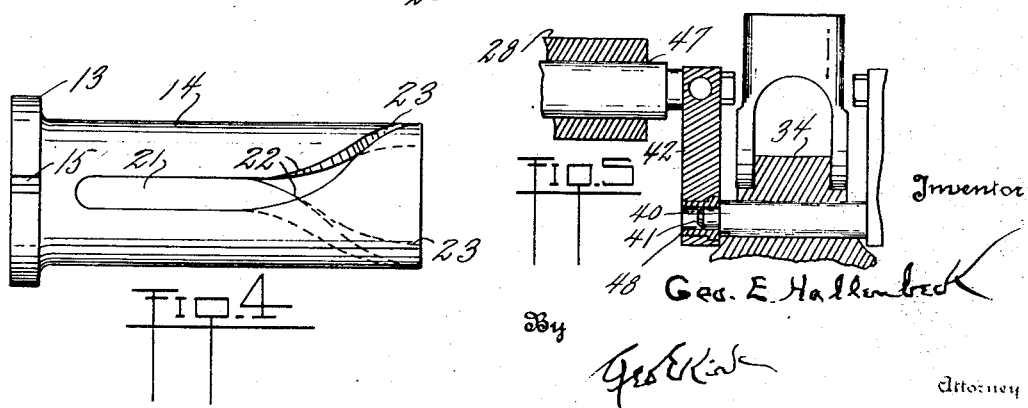

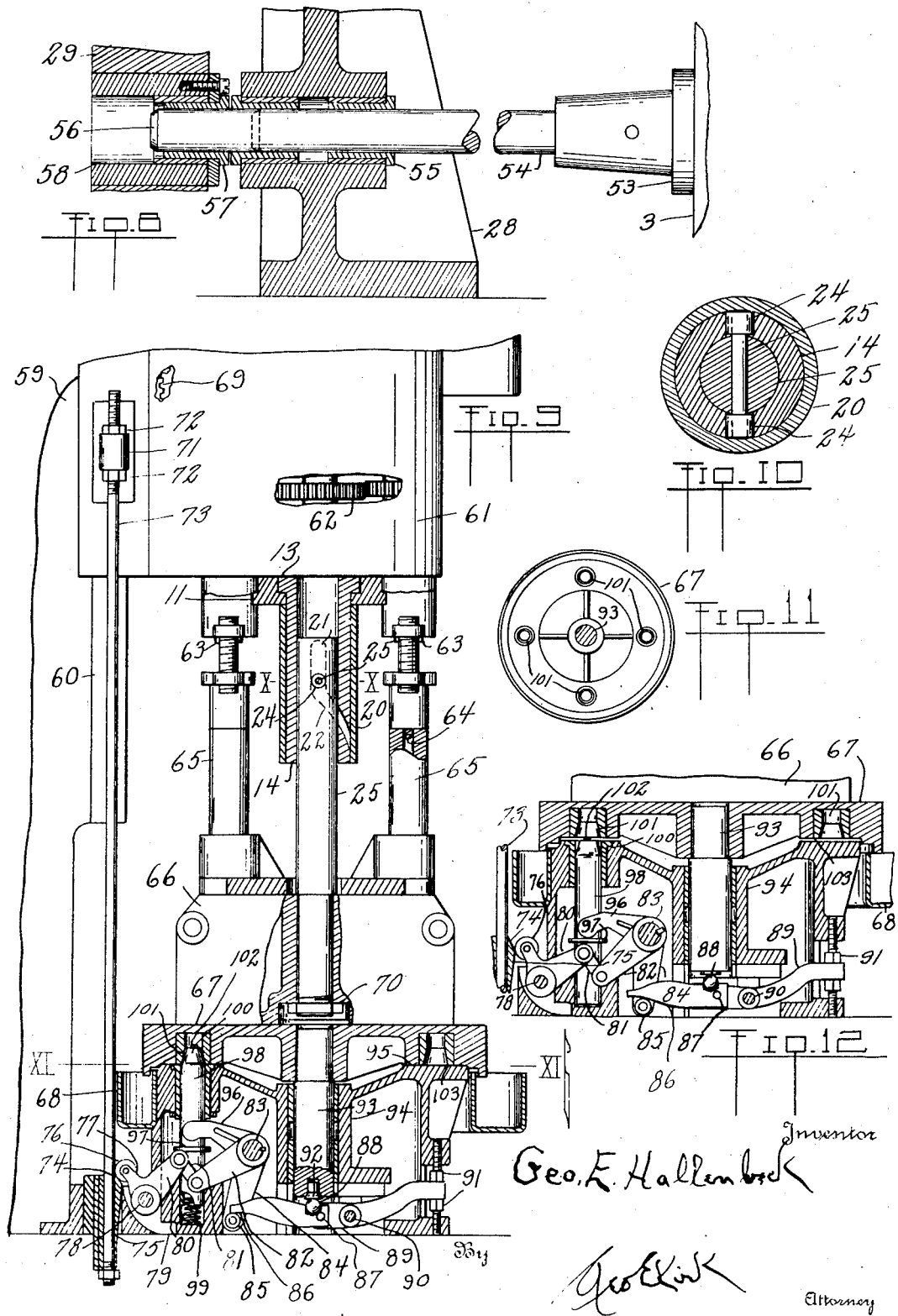

Patented July 18, 1933

1,918,538

UNITED STATES PATENT OFFICE

GEORGE E. HALLENBECK, OF TOLEDO, OHIO, ASSIGNOR TO BAKER BROTHERS, INC., OF TOLEDO, OHIO, A CORPORATION OF OHIO

TURRET INDEXING MEANS

Application filed May 15, 1930. Serial No. 452,791.

This invention relates to driving mechanism primarily between relatively transversely movable members.

This invention has utility when incorporated in indexing apparatus between a reciprocable member as a control for a plurality of rotary holders and an intermediate movable or rotary member as work holders, more particularly for successive presentation to the tools in sequence.

Referring to the drawings:

Fig. 1 is a side elevation of a horizontal boring machine embodying the indexing feature of the invention;

Fig. 2 is a partial section on an enlarged scale through the indexing mechanism;

Fig. 3 is a plan view of a portion of the indexing mechanism;

Fig. 4 is a detail view of the actuator sleeve of the indexing mechanism;

Fig. 5 is a section on the line V—V, Fig. 3;

Fig. 6 is a section on the line VI—VI, Fig. 2;

Fig. 7 is a section on the line VII—VII, Fig. 2;

Fig. 8 is a section on the line VIII—VIII, Fig. 6;

Fig. 9 is a fragmentary side elevation of an embodiment of the invention as adapted to a vertical tool or drill press instead of horizontal machine tool as shown in Fig. 1;

Fig. 10 is a section on the line X—X, Fig. 9;

Fig. 11 is a section on the line XI—XI, Fig. 9; and

Fig. 12 is a fragmentary view of the indexing cooperative brake and locking means at the released position to permit indexing movement.

Frame 1 (Fig. 1) is shown as provided with guide 2 mounting slides or heads 3 reciprocable along the guides 2 by mechanism 4. The respective slides 3 are shown as provided with motors 5 having transmission trains 6 therefrom for continuously rotating shafts 7 provided with couplings or rotary elements 8 carrying spindles or holders 9 (Fig. 2) mounting tools 10 for continuous rotation. These rotary elements 8 may be distributed in a series, say approximating an annular grouping, in an embodiment herein, wherein the work may travel in a cycle for one or more operations thereupon.

One of the slides 3 centrally of this series of rotary elements 8 is provided with overhanging flange 11 as a ring connected by bolts 12 to the slide 3. This overhanging flange 11 engages terminal flange 13 of sleeve 14. This flange 13 is provided with peripheral series of notches or teeth 15 (Fig. 7), preferably corresponding to the number of stations to be given the work hereunder.

Carried by this flange member 11 is a dog 16 normally engaged by ball 17 as thrust by spring 18 to be yieldably held as a pawl to engage the flange 13 and thereby lock the sleeve 14 against rotation in one direction. As herein shown, such is a holding against clockwise rotation.

The sleeve 14 (Fig. 2) is provided with thrust bearing 19 between such sleeve and the slide 3, thereby providing for anti-friction spacing between the flange 13 and the slide. Enveloping this sleeve 14 as a housing therefor and concentric therewith is supplemental sleeve 20. This sleeve 20 about the sleeve 14 houses diametric similar slots 21, 22, 23, in the sleeve 14. These slots or ways 21, 22, 23, form a cam engaged by rollers 24 as diametrical anti-friction projections from shaft 25 reciprocable in the sleeve 14 as a guide. This shaft 25 is mounted in lateral anti-friction bearings 26, 27, of intermediate holders 28 mounted on the frame 1 between the slides or heads 3.

Fixed with this shaft 25 between the bearings 26, 27, is member 29 to be shifted or rotated by the shaft 25. Fixed on this shaft 25, adjacent the bearing 27, is disk 30 having teeth 31 (Fig. 6) engageable by dog 32 pivotally mounted on the holder 28 and normally gravity thrown by handle 33 into one-way locking position of this pawl and ratchet device structure. The one-way holding action of this pawl and ratchet device 30, 32, is one permitting counter-clockwise rotation of the shaft 25 and the member 29 thereon, which is accordingly reverse holding to that of the pawl and ratchet device 13, 16.

There is provided on this pawl and ratchet device 30, 32, a similar number of teeth 31 to the seats or teeth 15, thereby taking care of holding against recover at the station positions for the holder member 29.

As it may be desired to release the holder for manual shifting, it is only necessary to grasp the weighted handle 33 and throw the pawl 32 out so that the holder 29 may be freely rotated in the direction permitted by the pawl 16. This shifting may be for locating the member 29 in a desired position for the chucks or holders 34 with work 35. As herein disclosed there may be sequence for step by step travel, even successively to different tools 10 for different stations of operation for work thereupon.

As herein disclosed there are two slides 3 for tools upon opposite sides of the holder 29. Work may be mounted therein for receiving an operation or operations upon one side by tool or tools 36 or opposing the tool or tools 10.

In the actuation step-up travel as effected by the sleeve 14 and projections 24, even in the rapid operation of the machine, there is holding against over driving due to the disk 30 having sockets 37 therein in series and at the approximate location for the rest position.

Ball 38 as actuated by compression spring 39 is thrust against the disk 30 and as the succeeding series of sockets 37 come into register with the ball 38, thrust by the spring 39, has braking action to slow up and bring the shaft 25 to the stop position without over travel. This device also takes strain off the actuating device. The recover pawl 32 is at once effective for holding in this position.

Additionally, the holders 34 herein may be provided with pins 40 having reduced ends 41 so that as the tools 10, 36, approach the work, the heads 3 move frame 42 therewith as a minor register assisting means.

Each frame 42 (Figs. 3, 6) is mounted on a pair of bolts 43, 44, for each line of work herein shown as five tools on each of three sides. These bolts are connected to the heads 3 by compressor bumper devices 45 having compression springs 46 so that in the travel forward of the heads 3, the respective frames 42 are not positive in the travel but are yieldably thrust forward as positively guided through openings 47 in the members 28, 29. It thus follows there is a definite holding for the respective frames 42 against lateral shifting but a slight give is permitted by the bumper devices in the direction of the reciprocation so that the tapered terminal portions 41 of the pins 40 may enter register-determining openings 48 (Fig. 5) in the frame 42, thus nicely determining the final register position for guides 49 (Fig. 2) through the frame 42 in directing the tool into the work.

Additionally, in the instance of cutting tools it is desirable to flood the tool in the region of cutting and to this end oil or screw cutting lubricant may be supplied through line 50 (Fig. 3) to the frames 42 and flow by way of duct 51 (Fig. 2) for discharge, by outlet ports 52, on the tools in the vicinity of the work.

One of the slides 3 additionally is herein shown as provided with fitting 53 (Fig. 8) and rod or bar 54 extends through bushing 55 in the holder 28. This bar 54 as thrust through this first holder 28 in the reciprocating movement of the slide 3 has its tapered end 56 enter primary bushing 57 in secondary bushing 58 mounted in the member 29. This device is a positive main angular position take-up and centering means for the holder or work which will permit dispensing with the devices such as shown in Fig. 5.

In operation, the motors 5 provide for continuous rotation of the elements 8 in rotating the tools 10, 36. As herein disclosed, this rotation on a working stroke may be as the tools 10, 36, approach each other or move toward the intermediate work holder member 29. As the working stroke is completed and the retraction of the slides 3 occurs in the idle operation, the sleeve 14 is held against rotation and accordingly provides an intermittent grip device in its coaction with the pin 24 traveling from the cam portions 21 along the cam portions 22 to the cam portions 23 as the sleeve 14 is drawn away from the member 29.

There is thus effected a step in the intermittent rotation of the member 29 herein shown as a 90° travel, permitted by the dog 32. As the retraction of the tools is completed, the reciprocating mechanism 4 for the slides may start the slides 3 for a repetition of the cycle of the operations in the event the machine is continuously operating instead of for cycles.

In this working stroke, the pawl and ratchet device 30, 32, holds the carrier 28 against recover travel, while the pawl and ratchet device 13, 15, is one permitting the 90° throw rotation of the sleeve 14. As this working stroke toward the carrier 29 is completed, the intermittent grip device is in position for a repetition of its cycle of operations wherein the separate pawl and ratchet devices are alternately effective in providing a one-direction working operation for effectiveness of the slot 22 in coacting with the pin 24 in rotating the holder carrier 29.

There is accordingly herein produced a simple mechanism incidental to the slide or head reciprocation, effecting, without the inter-position of special or separate mechanism, the intermittent driving to indexing position of the intermediate carrier herein shown as for the work.

In lieu of the horizontal extending frame 2 when this device is adapted to vertically disposed machine tools say of drill press type, frame 59 may be provided with guide 60 for slide 61 having transmission thereto of drill press type effective through gearing 62 for rotating tool holders 63 carrying tools 64 for operating on work 65 as mounted by auxiliary table or jig 66 fixed on rotary table 67 about which extends circular vessel or pan 68 as a lubricant accumulation trough for gathering the drippings from the cutting oils or lubricants in the machine tool operations.

Mechanism 69 is effective for reciprocating the slide 61 on the guide 60 toward and from the table 67. This slide 61 is shown as provided with flange 11 for engaging flange 13 of sleeve 14 within outer sleeve 20. Within the sleeve 14 is shaft 25 having diametrically disposed fixed roller projections 24 coacting with cam ways 21, 22, 23, in the sleeve 14. In the upward movement of this slide 61 after effecting the working stroke operation downward, there is a slight lift of the slide 61 in the cam portions 21 for the rollers 24 at which time flange 70 on the shaft 25 is effective for holding the shaft 25 downward with the load of the tables 66, 67.

The slide 61 is shown as provided with fixed ear 71 with which coact nuts 72 adjustably connecting to this slide 61 depending rod 73 having cam with abrupt portion 74 and taper portion 75 coacting with roller 76 on arm 77 of angle lever having fulcrum 78 in base 79 of the frame 1. This angle lever has additional arm 80 from which extends link 81 to arm 82 fast on fulcrum 83. From this fulcrum 83 depends arm 84 fixed with the arm 82.

This arm 84 carries roller 85 coacting with lower cam face 86 of lever having fulcrum 87 and upper thrust ball bearing or seat 88 a short arm distance from this fulcrum 87. This fulcrum 87 is in lever 89 having fixed fulcrum 90 and about which the fulcrum 87 is rocked by opposing bolts 91. This fixed fulcrum 87 for the lever having cam face 86 is thus one which may be very nicely adjusted into its fixed position for holding the lever having the cam face 86 on the bearing 88. This ball bearing 88 is in position at step or seat 92 of shaft 93 in bearing 94 of the frame base 79. This shaft 93 is the fixed bearing for the rotary table 67 coaxial with the shaft 25.

As the slide 61 is elevated for the rollers 24 to move toward entrance into the cam portions 22, the cam 74 is effective on the roller 76 so to rock the angle lever 77, 80, that the roller 85 may act on the cam face 86 for sufficiently lifting the shaft 93 and the table 67 that the load of this table 67 and its carried parts are relieved, if not actually clear of, friction supporting bearing 95 of the base 79.

Fixed with the arms 82, 84, is fork terminus arm 96 which, in this movement of the levers and linkage, swings downward against collar 97 on pin 98 thrusting such pin downward against the action of compression spring 99 so that this pin 98 has its taper upper extremity 100 withdrawn from taper opening 101 in the lower portion of the table 67. This means that simultaneously with the shifting of the load of the table 67 off the bearings 95, the locking pin 98, 100, is withdrawn so that the rollers 24 as acting on the cam portions 22 may effect the intermittent shifting action or indexing movement for the tables 66, 67. During this quick ascent of the slide 61, the roller 76 passes from the cam portion 74 along the cam portion 75 thereby allowing the spring 99 to thrust the pin 98 upward to have the friction pin terminus 102 of this pin 98 ride on the under side 103 of the table 67, which under side is also receiving frictional braking action in contacting with the bearing 95 because the roller 85 has so moved along the cam face 86 that the thrust bearing 88, 92, is not sustaining as much or any of the load of this table 67 and its carried parts.

There is accordingly a frictional braking of the rotation step or indexing shifting of the table as the cam portions 22 are effective.

As this idle stroke in lift is completed, the reverse travel of the slide 61 occurs, which is after the table 67 has been brought to the stop position and the pin 98 has entered an opening 101 at the rest position of the table 67. In this ascent the cam 75 is effective for withdrawing this pin 98 and allowing resetting of the pin by cam portion 74 before the work operation of the tools 64 really begins. This means that there is relieved any binding action of the table relatively to its support and there is accordingly a nicety in the indexing operations. The one-way effective sleeve 14 has its idle operation in this feed travel for it is connected with the slide 61 by the pawl and ratchet device of Fig. 7.

It is to be noted the idle travel is not only on the recover movement but is the entire period as out of the work so that a portion of the return stroke toward working position is still in idle movement. The invention herein is to effect the indexing movement, while the tool is out of the work and during such idle movement, whether recover or toward the work. As herein disclosed, this indexing movement occurs in the recover stroke or travel.

What is claimed and it is desired to secure by Letters Patent is:

1. A mounting, a reciprocable first member carried by said mounting, a rotary holder on the member, a second member also carried by the mounting, a holder movable on the member in a plane perpendicular to the rotary holder reciprocation, a drive for effecting the reciprocation of the first member in sequence, and an actuation-effecting transmission for the second member from the first member including between said members a step by step device embodying a sleeve having a curved slot and a pin coacting with said slot.

2. A frame providing a guide, a slide carried by and reciprocable along said guide, a holder mounted by the frame and having an axis parallel to the slide reciprocation, a drive for effecting reciprocation of the slide in sequence, and actuation connection from the slide for shifting the holder on its axis transversely of the direction of the slide reciprocation including between the slide and holder a step by step device embodying a sleeve having a curved slot and a pin coacting with said slot.

3. A frame providing a guide, a slide carried by and reciprocable along said guide, a rotary holder mounted by the frame on an axis directed toward the slide, a drive for effecting reciprocation of the slide in sequence, and intermittent drive actuation connection from the slide to the holder for shifting the holder transversely of the direction of the slide reciprocation including between the slide and holder a step by step device embodying a sleeve having a curved slot and a pin coacting with said slot.

4. A frame providing a guide, a multiple element control slide directed by said guide, a multiple-seat-providing rotary holder mounted by the frame on an axis parallel to the direction of slide reciprocation, a drive for effecting reciprocation of the slide in sequence, and intermittent drive actuation connection from the slide successively positioning the holder seats as to the slide elements including between the slide and holder a step by step device embodying a sleeve having a curved slot and a pin coacting with said slot.

5. A frame providing a guide, a multiple element control slide directed by said guide, a multiple-seat-providing rotary holder mounted by the frame for holder shifting in a plane perpendicular to slide reciprocation, a drive for effecting reciprocation of the slide in sequence, intermittent drive actuation connection from the slide successively positioning the holder seats as to the slide elements including between the slide and holder a step by step device embodying a sleeve having a curved slot and a pin coacting with said slot, and driving means for effecting relative rotation between the elements and seats.

6. A frame providing a guide, a slide reciprocable along the guide, a series of elements connected to be reciprocated by the slide, driving means for rotating the elements, an opposing holder provided with a bearing parallel to the direction of slide reciprocation, a plurality of seats connected to said holder for shifting therewith, and intermittent actuation connection from the slide for shifting said holder on said bearing as an axis transversely of the slide reciprocation in bringing the seats successively into alignment with said elements.

7. A machine tool embodying a reciprocable first member, a rotary holder mounted on the reciprocable first member, an opposing second member, a drive for effecting the reciprocation of the first member in sequence, and a second member one-way shifting drive connection from the first member comprising curved slotted sleeve and a pin engaging element.

8. A machine tool embodying a reciprocable first member, a rotary holder mounted on the reciprocable first member, an opposing second member, a drive for effecting the reciprocation of the first member in sequence, and a second member shifting connection from the first member comprising a pair of relatively telescopic elements including a slotted sleeve and a pin, one connected to each member coacting on first member travel to give a predetermined step travel for the second member in synchronism with said sequence.

9. A machine tool embodying a reciprocable first member, an opposing second member, a second member shifting connection from the first member comprising a pair of relatively telescopic elements, one connected to each member coacting on first member idle travel to give a predetermined step travel for the second member, and holding means for the second member against recover travel during working travel of the first member.

10. A machine tool embodying a reciprocable first member, an opposing second member, a second member shifting connection from the first member comprising a pair of relatively telescopic elements, one connected to each member coacting on first member idle travel to give a predetermined step travel for the second member, register control positioning means between the members, and holding means for the second member against recover travel during working travel of the first member.

11. A machine tool embodying a reciprocable member, a rotary holder, a mounting fixing the holder axis parallel with the reciprocable member, a rotary holder mounted on the reciprocable member, and a one-way shifting connection from the holder for the member including interfitting telescoping elements.

12. A machine tool embodying a reciprocable member, a rotary holder, a mounting fixing the holder axis parallel with the reciprocable member, a rotary holder mounted on the reciprocable member, and a one-way shifting connection from the holder for the member including a sleeve, a plunger therein, and cooperating means therebetween including a cam.

13. A machine tool embodying a reciprocable tool carrier, a rotary tool holder mounted on the reciprocable tool carrier, a rotary work holder, a mounting fixing the holder axis parallel with the reciprocable carrier, and a rotary indexing device therebetween including a sleeve fixed with the tool carrier, and a plunger fixed with the holder.

14. A machine tool embodying a reciprocable tool carrier, a rotary work holder, a mounting fixing the holder axis parallel with the reciprocable carrier, a rotary indexing device therebetween including a sleeve fixed with the tool carrier, a locking means for the holder, and connections for withdrawing such means for releasing said holder for shifting into indexing position.

15. A machine tool embodying a reciprocable tool carrier, a rotary work holder, a mounting fixing the holder axis parallel with the reciprocable carrier, a rotary indexing device therebetween including a sleeve fixed with the tool carrier, there being resistance means for the holder as approaching indexing position, and holding means for the holder at indexing position.

16. A machine tool embodying a reciprocable tool carrier, a rotary work holder, a mounting fixing the holder axis parallel with the reciprocable carrier, a rotary indexing device therebetween including a sleeve fixed with the tool carrier, and freeing means for releasing the holder for indexing movement and retarding the holder by frictional resistance as approaching the end of the indexing movement.

17. A machine tool embodying a reciprocable tool carrier, a rotary work holder, a mounting fixing the holder axis parallel with the reciprocable carrier, a rotary indexing device therebetween including a sleeve fixed with the tool carrier, freeing means for lifting the holder for indexing movement and lowering the holder for frictional resistance as approaching the end of the indexing movement, and a locking means for the holder at the indexing movement position.

18. A machine tool embodying a reciprocable tool carrier, a rotary work holder, a mounting fixing the holder axis parallel with the reciprocable carrier, a rotary indexing device therebetween including a sleeve fixed with the tool carrier, freeing means for lifting the holder for indexing movement and lowering the holder for frictional resistance as approaching the end of the indexing movement, a locking pin for the holder at the indexing movement position, and a control for withdrawing and resetting the pin at the indexing position.

19. A machine tool embodying a reciprocable tool carrier member, a rotary work holder member, a mounting fixing the holder member axis parallel with the reciprocable carrier member, a rotary indexing device therebetween including a sleeve fixed with one of the members, locking means for the holder member, and connections for withdrawing such means for releasing said holder member for shifting into indexing position.

20. A machine tool embodying a reciprocable tool carrier, a rotary tool holder mounted on the reciprocable tool carrier, a rotary work holder, a drive for effecting reciprocation of the carrier in sequence, a mounting fixing the holder axis parallel with the reciprocable carrier, and a rotary indexing device therebetween, including a slotted sleeve and shaft having a pin for engaging said sleeve, said shaft and sleeve being concentric with the holders.

21. A mounting, a first member carried by the mounting, a single direction rotary drive effecting reciprocation of the first member, an annular series of rotary holders on the member, a second member also carried by the mounting, a holder rotatable on the second member in a plane perpendicular to the plane of reciprocation of the series of rotary holders and coaxial with said series, and a transmission effective from the second member reciprocation for giving step by step rotation thereto including a pin-and-a-slotted-sleeve device.

GEO. E. HALLENBECK.

CERTIFICATE OF CORRECTION.

Patent No. 1,918,538.                      July 18, 1933.

GEORGE E. HALLENBECK.

It is hereby certified that error appears in the printed specification of the above numbered patent requiring correction as follows: Page 4, line 80, claim 7, after "element" insert the words "to effect said second member shifting in synchronism with said sequence"; and that the said Letters Patent should be read with this correction therein that the same may conform to the record of the case in the Patent Office.

Signed and sealed this 15th day of August, A. D. 1933.

M. J. Moore.
Acting Commissioner of Patents.

(Seal)